US010300985B2

(12) United States Patent
Mano

(10) Patent No.: US 10,300,985 B2
(45) Date of Patent: May 28, 2019

(54) ELECTRIC-MOTOR-ASSISTED BICYCLE

(71) Applicant: YAMAHA HATSUDOKI KABUSHIKI KAISHA, Iwata-shi, Shizuoka (JP)

(72) Inventor: Yasunori Mano, Shizuoka (JP)

(73) Assignee: YAMAHA HARSUDOKI KABUSHIKI KAISHA, Shizuoka (JP)

( * ) Notice: Subject to any disclaimer, the term of this patent is extended or adjusted under 35 U.S.C. 154(b) by 111 days.

(21) Appl. No.: 15/453,974

(22) Filed: Mar. 9, 2017

(65) Prior Publication Data
US 2017/0314593 A1 Nov. 2, 2017

(30) Foreign Application Priority Data

Apr. 28, 2016 (JP) ................................. 2016-091470

(51) Int. Cl.
B62M 6/45 (2010.01)
B62M 6/55 (2010.01)
(Continued)

(52) U.S. Cl.
CPC ............... B62M 6/55 (2013.01); B62K 11/04 (2013.01); B62K 19/34 (2013.01); B62M 6/45 (2013.01);
(Continued)

(58) Field of Classification Search
CPC . B62M 6/40; B62M 6/45; B62M 6/55; B62M 6/90; B62K 19/34
See application file for complete search history.

(56) References Cited

U.S. PATENT DOCUMENTS 5,633,095 A * 5/1997 Ishikawa .................... B62J 1/08
180/68.5
6,591,929 B1 * 7/2003 Tsuboi ..................... B62M 6/70
180/206.4
(Continued)

FOREIGN PATENT DOCUMENTS

CN 1386655 A 12/2002
CN 204674764 U 9/2015
(Continued)

OTHER PUBLICATIONS

Official Communication issued in Chinese Patent Application No. 201710135410.0, dated Jan. 2, 2019.

Primary Examiner — Joseph M Rocca
Assistant Examiner — Maurice L Williams
(74) Attorney, Agent, or Firm — Keating and Bennett, LLP

(57) ABSTRACT

A drive unit reliably and stably attached to a bracket, even if the bracket has high stiffness, includes a housing including first and second suspension bosses located between first and second side plates of the bracket in a left-right direction of a bicycle. A first bolt is fastened to the first suspension boss and inserted from an outside in the left-right direction of the bicycle into a hole in the first side plate. A cylindrical member is fitted into an insertion hole in the second suspension boss that is open toward the second side plate. The cylindrical member is slidable in the left-right direction of the bicycle and includes a thread groove located on an inner periphery thereof engaging a thread located on an outer periphery of a second bolt that is inserted from the outside in the left-right direction of the bicycle into a hole in the second side plate.

9 Claims, 11 Drawing Sheets

(51) Int. Cl.
    *B62K 11/04*     (2006.01)
    *F16B 5/02*     (2006.01)
    *B62K 19/34*     (2006.01)
    *B62M 6/90*     (2010.01)
    *B62M 9/121*     (2010.01)
    *B62K 25/28*     (2006.01)
    *B62K 25/30*     (2006.01)

(52) U.S. Cl.
    CPC .......... *F16B 5/0233* (2013.01); *B62K 25/286* (2013.01); *B62K 25/30* (2013.01); *B62M 6/90* (2013.01); *B62M 9/121* (2013.01)

(56) References Cited

U.S. PATENT DOCUMENTS

| | | | |
|---|---|---|---|
| 6,669,422 B1 * | 12/2003 | Sterle | F16B 5/0233 411/178 |
| 7,895,951 B1 * | 3/2011 | McGrath, Jr. | B60L 5/005 104/292 |
| 2002/0176739 A1 | 11/2002 | Goto et al. | |
| 2007/0041808 A1 * | 2/2007 | Iwata | B62D 25/147 411/386 |
| 2012/0051869 A1 | 3/2012 | Johansen | |
| 2013/0341112 A1 * | 12/2013 | Shiraishi | H02K 1/185 180/206.4 |
| 2014/0166384 A1 * | 6/2014 | Ishida | B62M 6/50 180/206.3 |
| 2014/0166386 A1 * | 6/2014 | Arimune | B62M 6/45 180/206.3 |
| 2014/0210318 A1 | 7/2014 | Yao | |
| 2015/0291256 A1 * | 10/2015 | Taitt | B62M 6/65 475/2 |
| 2016/0339992 A1 * | 11/2016 | Yoshiie | B62M 6/45 |
| 2016/0375954 A1 * | 12/2016 | Talavasek | B62K 19/36 180/220 |
| 2017/0313381 A1 * | 11/2017 | Mano | B62K 25/286 |

FOREIGN PATENT DOCUMENTS

| | | |
|---|---|---|
| CN | 204821974 U | 12/2015 |
| DE | 4102455 A1 | 7/1992 |
| GB | 980 606 A | 1/1965 |
| GB | 1039089 A | 8/1966 |
| JP | 61-135013 U | 8/1986 |
| JP | 08253188 | * 10/1996 |
| JP | 2000-62679 A | 2/2000 |
| JP | 2014-144768 A | 8/2014 |
| WO | 2013/050193 A1 | 4/2013 |

* cited by examiner

ELECTRIC-MOTOR-ASSISTED BICYCLE

CROSS REFERENCE TO RELATED APPLICATIONS

This application claims the benefit of priority to Japanese Patent Application No. 2016-091470 filed on Apr. 28, 2016. The entire contents of this application are hereby incorporated herein by reference.

BACKGROUND OF THE INVENTION

1. Field of the Invention

The present invention relates to electric-motor-assisted bicycles, and more particularly to electric-motor-assisted bicycles including a drive unit attached to a vehicle-body frame.

2. Description of the Related Art

Bicycles are used by many people, regardless of age and gender, as a handy transportation means. In recent years, electric-motor-assisted bicycles that add motor driving forces to rider pedaling forces to assist the rider have become popular. Such an electric-motor-assisted bicycle is disclosed in JP 2000-62679 A, for example.

JP 2000-62679 A describes an electric-motor-assisted bicycle that includes a drive unit. The drive unit includes a crank axle. Pedals are mounted on the crank axle by arms. The drive unit is attached to a bracket disposed on a bottom of a vehicle-body frame.

According to JP 2000-62679 A, the bracket includes a top plate and a pair of side plates. The side plates extend downward from the top plate. The drive unit includes a suspension boss. The suspension boss is located between the side plates. A hole is provided in each of the side plates. A bolt is inserted through the hole in one of the side plates from an outside in a left-right direction of the vehicle. The bolt extends through the suspension boss and is inserted through the hole in the other side plate from an inside in the left-right direction of the vehicle. A nut is attached to a tip of the bolt. Thus, the drive unit is attached to the bracket.

SUMMARY OF THE INVENTION

When a drive unit is attached to a bracket as described above, a suspension boss, which is part of the drive unit, must be inserted between two side plates. Accordingly, a small gap is located between each side plate and the suspension boss, and tightening forces of the bolt deform the side plates by the amounts of the gaps. The side plates are closely attached to the drive unit and tightened together to provide sufficient attachment strength of the drive unit with respect to the bracket.

The present inventors considered increasing a stiffness of the bracket on an electric-motor-assisted bicycle used under harsh conditions, such as racing, to increase an attachment strength or connecting force between the drive unit and the vehicle-body frame. However, for a bracket with very high stiffness, it is difficult to sufficiently deform the side plates, which makes it difficult to tightly sandwich the drive unit between the side plates. Thus, the attachment strength or connecting force between the drive unit and the bracket may decrease.

Preferred embodiments of the present invention include a drive unit that is reliably and securely attached to the bracket even when the bracket has a high stiffness.

An electric-motor-assisted bicycle according to a preferred embodiment of the present invention includes: a front wheel; a rear wheel, a vehicle-body frame, and a drive unit. The rear wheel is located rearward of the front wheel with respect to the bicycle. The vehicle-body frame supports the front wheel and the rear wheel. The drive unit is attached to the vehicle-body frame. The drive unit generates driving power to be transmitted to the rear wheel. The drive unit includes a housing and a crank axle. The crank axle extends through the housing in a left-right direction with respect to the bicycle. The vehicle-body frame includes a bracket. The drive unit is attached to the bracket. The bracket includes a top plate, a first side plate, and a second side plate. The first side plate is connected to the top plate. The second side plate is connected to the top plate. The second side plate is spaced apart from the first side plate along the left-right direction with respect to the bicycle. The housing includes a first suspension boss and a second suspension boss. The first suspension boss and the second suspension boss are located between the first side plate and the second side plate along the left-right direction with respect to the bicycle. A first bolt is fastened to the first suspension boss. The first bolt is inserted into a hole provided in the first side plate from an outside along the left-right direction with respect to the bicycle. An insertion hole is provided in the second suspension boss. The insertion hole extends in the left-right direction with respect to the bicycle and is open toward the second side plate. The electric-motor-assisted bicycle further includes a cylindrical member. The cylindrical member is fitted into the insertion hole and is slidable in a direction in which the insertion hole extends. A thread groove is provided on an inner periphery of the cylindrical member. The thread groove engages a thread provided on an outer periphery of a second bolt. The second bolt is inserted into a hole provided in the second side plate from the outside along the left-right direction with respect to the bicycle. As the first bolt is tightened, the housing moves toward the first side plate along the left-right direction with respect to the bicycle. As a result, the housing is pushed against the first side plate. As the second bolt is tightened, the cylindrical member moves in a direction outward of the insertion hole. As a result, the cylindrical member is pushed against the second side plate.

In a preferred embodiment of the present invention, a drive unit is securely attached to a bracket of an electric-motor-assisted bicycle even when the bracket has a high stiffness.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
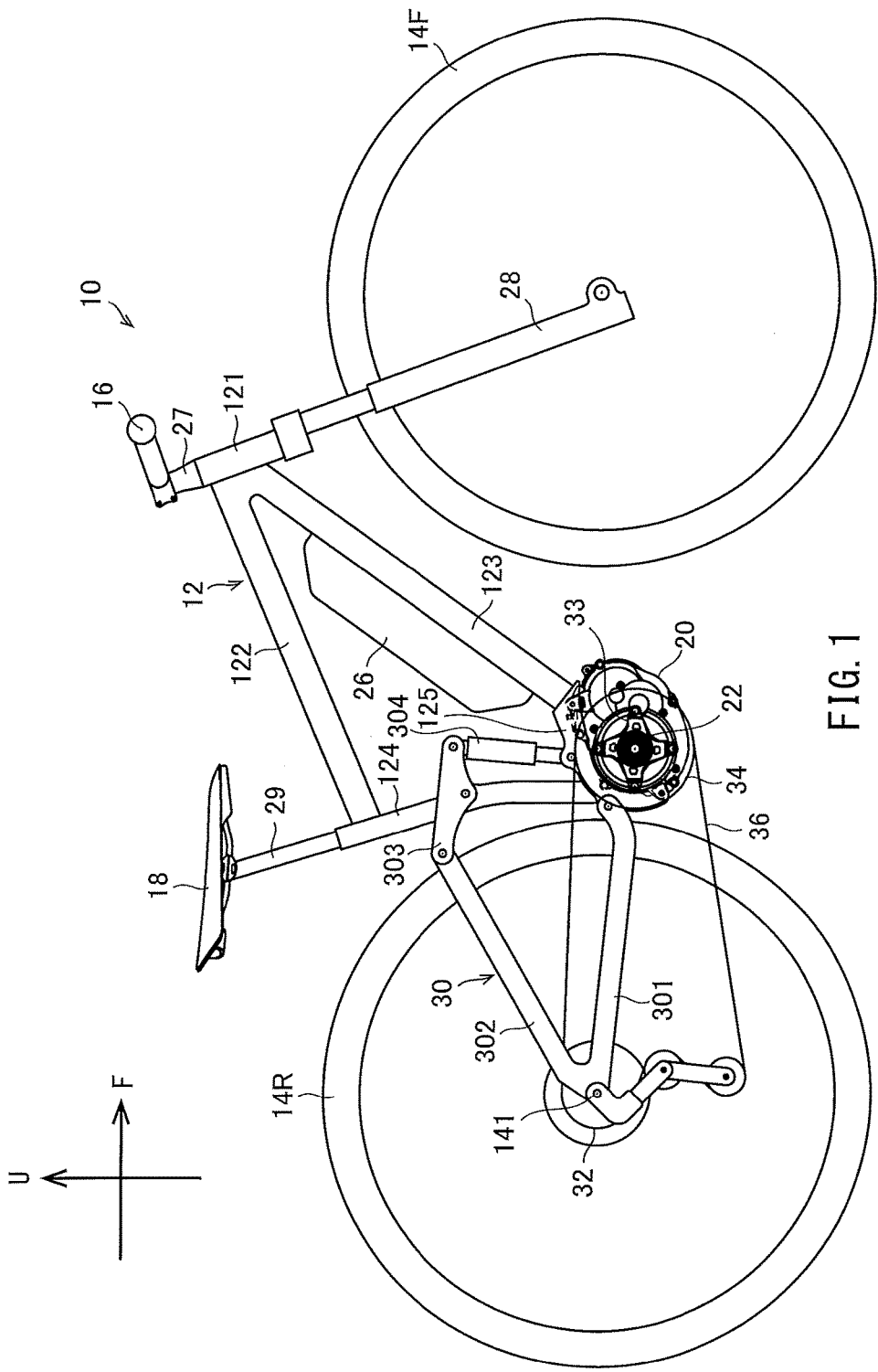
FIG. 1 is a right-side view of an electric-motor-assisted bicycle according to a preferred embodiment of the present invention.

The present inventors researched and developed a structure that improves an attachment strength or connecting force between a drive unit and a vehicle-body frame.

The drive unit is attached to the vehicle-body frame via a bracket. A suspension boss of the drive unit is inserted between two side plates of the bracket, and a small gap is located between each side plate and the suspension boss.

When such gaps are present and the drive unit is attached to the bracket, the drive unit is merely suspended by a bolt extending through the suspension boss. Thus, it is difficult to achieve a secure connection between the drive unit and the bracket.

To address this problem, the drive unit may be sandwiched between the side plates by the bolt and a nut to securely attach the drive unit to the bracket. For example, tightening forces of the bolt deform the side plates inwardly in the left-right direction of the vehicle by amounts of the gaps, and the side plates are closely attached to the drive unit and tightened together. This tightening securely and reliably attaches the drive unit to the bracket.

To further increase the connecting force or attachment force between the drive unit and the bracket of the vehicle-body frame, the present inventors considered increasing a stiffness of the bracket itself. For example, they considered adjusting the shape, material, thickness and other characteristics of the bracket to significantly increase the stiffness of the side plates. Unfortunately, this increased stiffness makes it difficult to deform the side plates with tightening forces of the bolt and, thus makes it difficult to tightly attach the side plates to the drive unit. As such, with this arrangement, it may be impossible to securely attach the drive unit to the bracket.

Accordingly, the present inventors developed a structure that allows the drive unit to be securely attached to the bracket even when the bracket has a high stiffness. The inventors focused on and researched thread characteristics, and developed preferred embodiments of the present invention.

Preferred embodiments of the present invention will be described below with reference to the drawings. The same or corresponding elements or features are labeled with the same characters in the drawings and their description will not be repeated.

Referring to FIG. 1, an electric-motor-assisted bicycle 10 according to a preferred embodiment of the present invention will be described. FIG. 1 is a schematic right-side view of the electric-motor-assisted bicycle 10.

In the following description, the directions "front/forward", "rear/rearward", "left", "right", "top/upward" and "bottom/downward" mean directions as perceived by a rider sitting on a saddle 18 of the electric-motor-assisted bicycle 10. In the drawings referred to in the following description, arrow "F" indicates a forward direction of the vehicle; arrow "U" indicates an upward direction of the vehicle; arrow "L" indicates a left direction of the vehicle; and arrow "R" indicates a right direction of the vehicle.

The electric-motor-assisted bicycle 10 includes a vehicle-body frame 12, a front wheel 14F, a rear wheel 14R, handlebars 16, a saddle 18, a drive unit 20, and a battery 26.

The vehicle-body frame 12 includes a head tube 121, a top tube 122, a down tube 123, a seat tube 124 and a bracket 125.

The head tube 121 is located at a front of the vehicle-body frame 12 and extends in a top/bottom direction. A stem 27 is inserted into the head tube 121 such that the stem is rotatable. Handlebars 16 are fixed to a top end of the stem 27. A front fork 28 is fixed to a bottom end of the stem 27. The front wheel 14F is rotatably attached to a bottom end of the front fork 28. For example, the front wheel 14F is supported by the vehicle-body frame 12 with the stem 27 and the front fork 28 located in between.

The top tube 122 is located rearward of the head tube 121 and extends in a front/rear direction. A front end of the top tube 122 is connected to the head tube 121. A rear end of the top tube 122 is connected to the seat tube 124.

The down tube 123 is located rearward of the head tube 121 and extends in the front/rear direction. The down tube 123 is located below the top tube 122. A front end of the down tube 123 is connected to the head tube 121. In the present preferred embodiment, the front end of the down tube 123 is also connected to the front end of the top tube 122, for example. A rear end of the down tube 123 is connected to the bracket 125.

The battery 26 is attached to the down tube 123. The battery 26 supplies the drive unit 20 with electric power. The battery 26 includes a chargeable/dischargeable battery and a controller. The controller is configured or programmed to control charging or discharging of the battery, and monitor battery output current, remaining battery level, and other parameters.

The seat tube 124 is located rearward of the top tube 122 and the down tube 123 and extends in the top/bottom direction. A bottom end of the seat tube 124 is connected to the bracket 125. For example, the seat tube 124 extends upwardly from the bracket 125.

The seat tube 124 is bent or curved at a center in the top/bottom direction. As such, a lower portion of the seat tube 124 extends in the top/bottom direction and an upper portion of the seat tube 124 extends in a direction angled relative to the top/bottom direction.

A seat post 29 is inserted into the seat tube 124. The saddle 18 is attached to a top end of the seat post 29.

The bracket 125 is located at a bottom of the vehicle-body frame 12. The bracket 125 supports the drive unit 20. The drive unit 20 generates driving forces to be transmitted to the rear wheel 14R which is located rearward of the front wheel 14F. The bracket 125 and the drive unit 20 will be described in detail below.

The vehicle-body frame 12 further includes a swing arm 30, a pair of connecting arms 303 and a suspension 304. The swing arm 30 includes a pair of chain stays 301 and a pair of seat stays 302.

The chain stays 301 are arranged in the left/right direction and extend in the front/rear direction. The rear wheel 14R is located between the chain stays 301. The chain stays 301 are mirror images of each other. Accordingly, only the right chain stay 301 is shown in FIG. 1.

A front end of each of the chain stays 301 is attached to the bracket 125. For example, the chain stays 301 extend rearwardly from the bracket 125. The chain stays 301 swing or pivot relative to the bracket 125 about an axis that extends in the left/right direction.

An axle 141 of the rear wheel 14R is attached to rear ends of the chain stays 301 such that the axle 141 cannot rotate. For example, the rear wheel 14R is supported on the chain stays 301 such that the rear wheel rotates about the axle 141. Thus, the rear wheel 14R is supported by the vehicle-body frame 12. A multi-stage driven sprocket 32 is fixed to the rear wheel 14R.

The seat stays 302 are arranged in the left/right direction and extend in the front/rear direction. The rear wheel 14R is located between the seat stays 302. The seat stays 302 are mirror images of each other. Accordingly, only the right seat stay 302 is shown in FIG. 1.

A rear end of the left seat stay 302 is connected to a rear end of the left chain stay 301. A rear end of the right seat stay 302 is connected to a rear end of the right chain stay 301.

The connecting arms 303 are arranged in the left/right direction and extend in the front/rear direction. The seat tube 124 is located between the connecting arms 303. The connecting arms 303 are mirror images of each other. Accordingly, only the right connecting arm 303 is shown in FIG. 1.

The connecting arms 303 are attached to the seat tube 124. The connecting arms 303 swing or pivot relative to the seat tube 124 about an axis that extends in the left/right direction.

As viewed from a side of the vehicle, front ends of the connecting arms 303 are located forward of the seat tube 124. As viewed from a side of the vehicle, rear ends of the connecting arms 303 are located rearward of the seat tube 124.

The rear end of the left connecting arm 303 is attached to a front end of the left seat stay 302. The left connecting arm 303 swings or pivots relative to the left seat stay 302 about an axis that extends in the left/right direction.

The rear end of the right connecting arm 303 is attached to a front end of the right seat stay 302. The right connecting arm 303 swings or pivots relative to the right seat stay 302 about an axis that extends in the left/right direction.

The suspension 304 is located forward of the seat tube 124 and rearward of the down tube 123. A top end of the suspension 304 is attached to the connecting arms 303. The suspension 304 swings or pivots relative to the connecting arms 303 about an axis that extends in the left/right direction. A bottom end of the suspension 304 is attached to the bracket 125. The suspension 304 swings or pivots relative to the bracket 125 about an axis that extends in the left/right direction. The suspension 304 is attached to the bracket 125 at a position that is forward of a position at which the seat tube 124 is attached to the bracket 125.

A driving sprocket 34 is attached to the drive unit 20 with a support 33 located in between. A chain 36 is wound about the driving sprocket 34 and driven sprocket 32.

A crank arm is attached to each end of a crank axle 22 included in the drive unit 20, in an axial direction. A pedal is attached to each of the crank arms.

Figure 2:
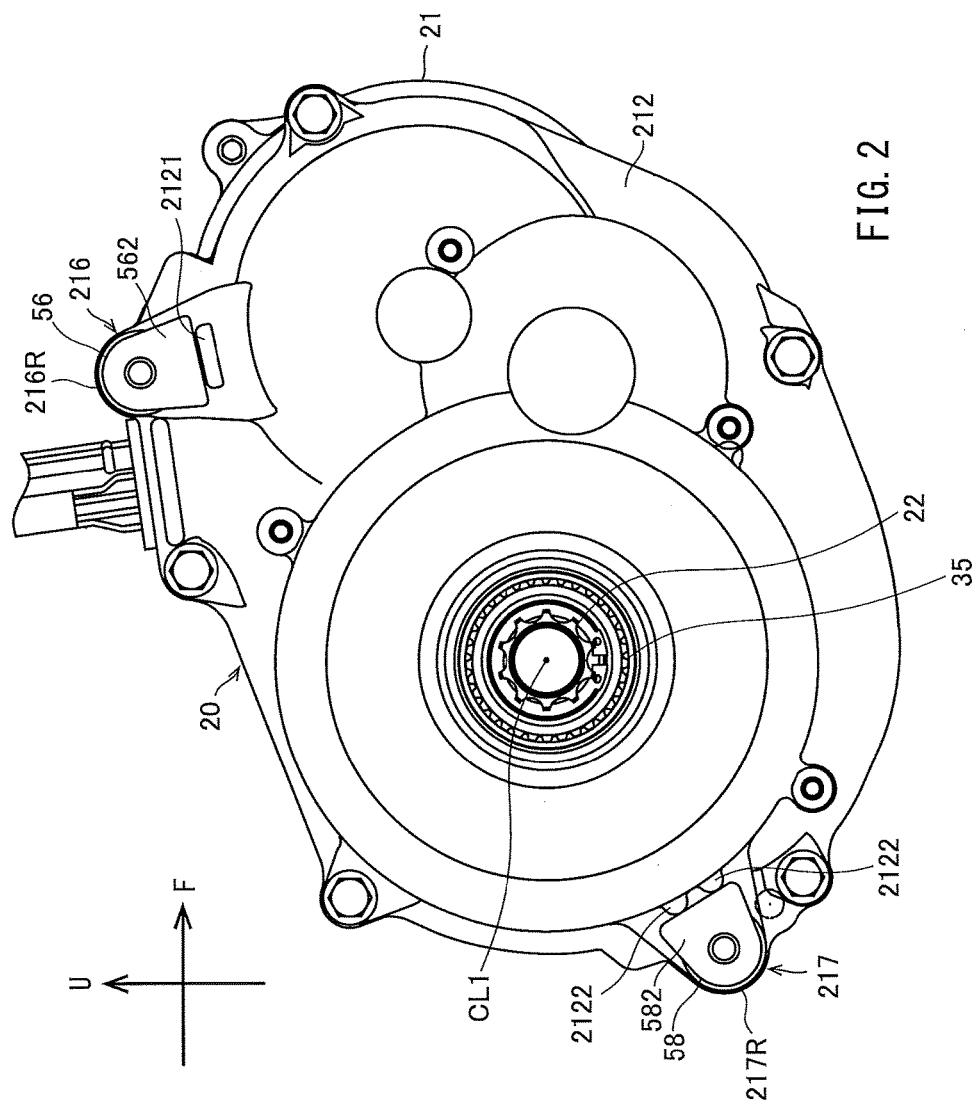
FIG. 2 is a right-side view of the drive unit.
Figure 3:
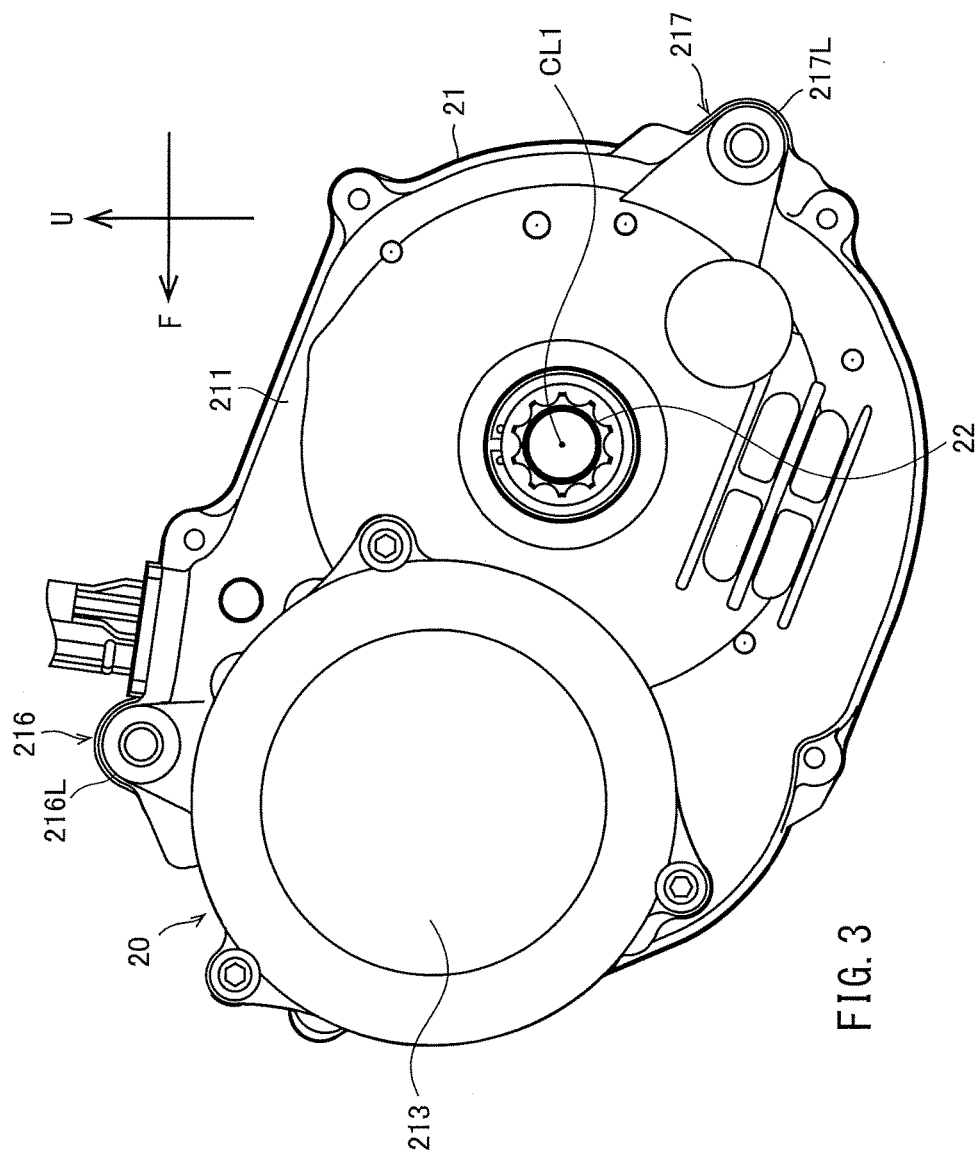
FIG. 3 is a left-side view of the drive unit.

The drive unit 20 will be described with reference to FIGS. 2 and 3. FIG. 2 is a right-side view of the drive unit 20. FIG. 3 is a left-side view of the drive unit 20.

The drive unit 20 includes a housing 21 and the crank axle 22. These components will be described below.

The housing 21 is fixed to the bracket 125. The housing 21 includes a left housing 211, a right housing 212 and a cover 213. The left housing 211, the right housing 212 and the cover 213 are made of a metal material, for example. The metal material may be an aluminum alloy, for example.

The left housing 211 is laid over the right housing 212 from the left in the left/right direction. The left housing 211 is fixed to the right housing 212 by a plurality of fasteners. A space is defined by the left housing 211 and the right housing 212. A reduction gear that reduces a speed of a rotation of a motor is housed in this space.

The cover 213 is laid over the left housing 211 from the left in the left/right direction. The cover 213 is fixed to the left housing 211 by a plurality of fasteners. A space which houses the motor is defined by the cover 213 outside of the left housing 211 (for example, to the left thereof).

The crank axle 22 extends through the housing 21 in the left/right direction. The crank axle 22 is supported on the housing 21 such that the crank axle is rotatable about a central axis CL1 of the crank axle 22.

In the drive unit 20, human power supplied to the crank axle 22 and motor drive power, which depends on the magnitude of the human power, are supplied to a resultant-force output axle 35 and transmitted to the driving sprocket 34 (FIG. 1) via the support 33. The drive power transmitted to the driving sprocket 34 is transmitted to the driven sprocket 32 (FIG. 1) via the chain 36 (FIG. 1). The drive power transmitted to the driven sprocket 32 rotates the rear wheel 14R. For example, the drive unit 20 generates driving power to be transmitted to the rear wheel 14R. The electric-motor-assisted bicycle 10 assists the rider by adding drive power from the motor to tread forces of the rider.

Figure 4:
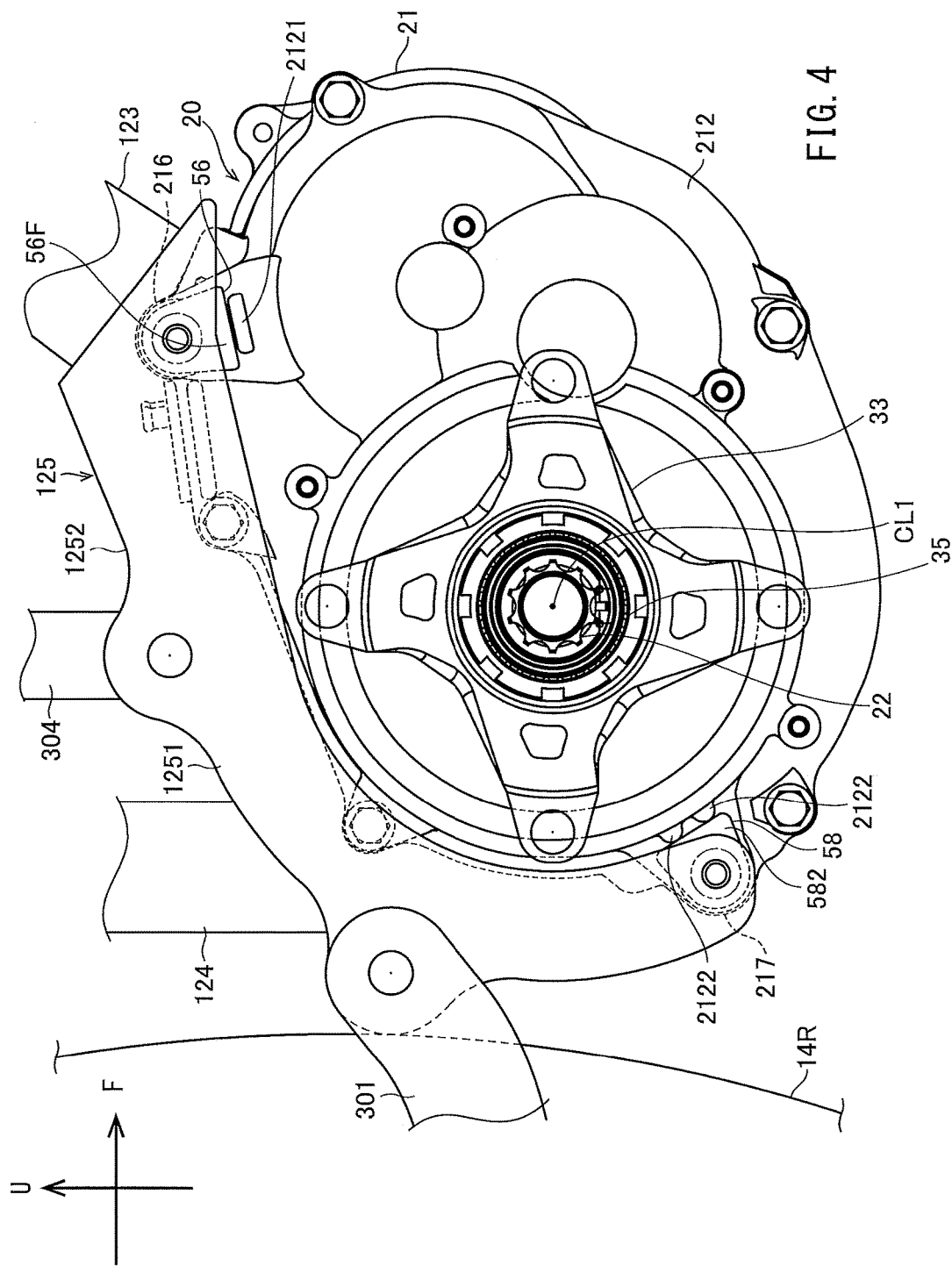
FIG. 4 is an enlarged right-side view of the drive unit attached to a bracket.

A structure that attaches the drive unit 20 to the bracket 125 will be described with reference to FIG. 4. FIG. 4 is an enlarged right-side view of the drive unit 20, shown in FIG. 2, attached to the bracket 125. In FIG. 4, the support 33 is attached to the resultant-force output axle 35.

The bracket 125 includes a pair of side plates 1251 arranged in the left-right direction, one to the left and the other to the right. The side plates 1251 extend in the front-to-rear direction and in the top-to-down direction. The left and right side plates 1251 are mirror images of each other. Accordingly, FIG. 4 only shows the right side plate 1251.

The bottom end of the suspension 304 is swingably or pivotably attached to the side plates 1251. The front ends of the chain stays 301 are swingably or pivotably attached to the side plates 1251. The bottom end of the suspension 304 is located forward of and higher than the front ends of the chain stays 301.

Figure 5:
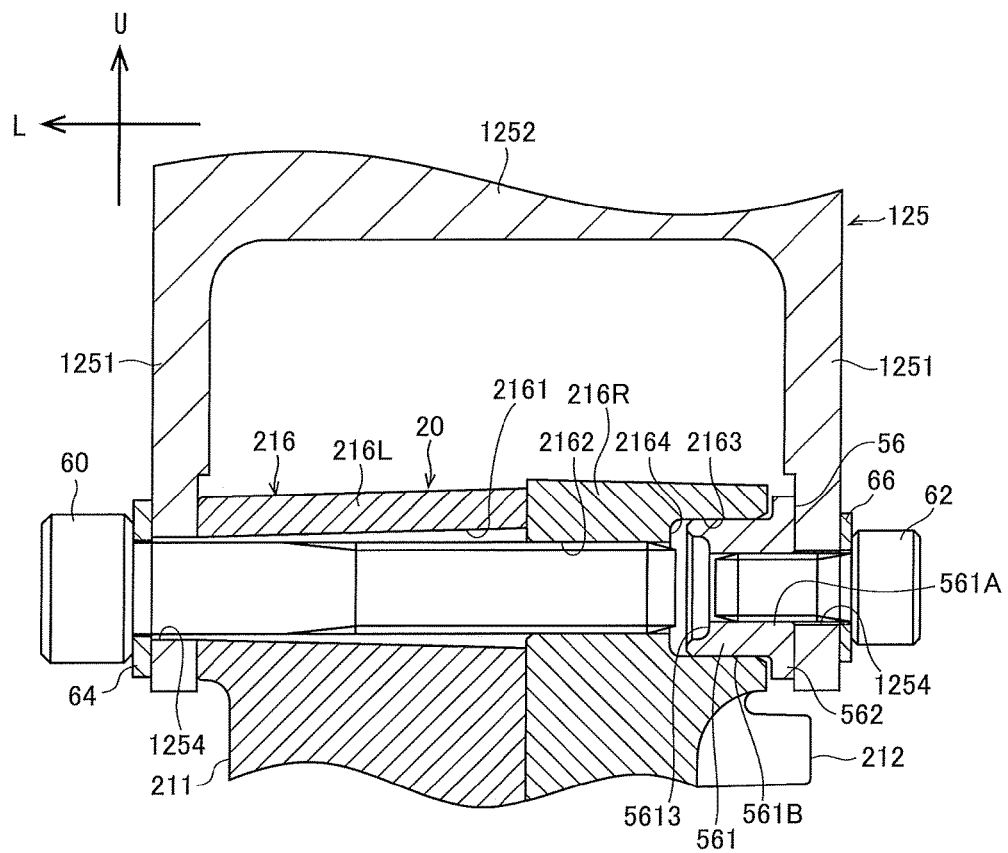
FIG. 5 is a cross-sectional view illustrating a structure that attaches the drive unit to the bracket.

As shown in FIG. 5, the bracket 125 further includes a top plate 1252. The top plate 1252 connects the side plates 1251.

The left side plate 1251 extends from the left edge of the top plate 1252. The left side plate 1251 extends toward the drive unit 20.

The right side plate 1251 extends from the right edge of the top plate 1252. The right side plate 1251 extends toward the drive unit 20.

The bottom end of the seat tube 124 and a bottom end of the down tube 123 are connected to the top plate 1252.

Two attachment portions 216 and 217 of the drive unit 20 will be described with reference to FIGS. 2 and 3. The two attachment portions 216 and 217 attach the drive unit 20 to the bracket 125.

The attachment portion 216 is located on the housing 21. The attachment portion 216 protrudes from an outer surface of housing 21. The attachment portion 216 is located forward of and higher than the crank axle 22.

The attachment portion 216 includes a boss 216L and a boss 216R. The attachment portion 216 will be described in detail below with reference to FIG. 5.

The boss 216L is located on the left housing 211. The boss 216L protrudes from an outer surface of the left housing 211.

A hole 2161 is located in the boss 216L. The hole 2161 extends in the left-right direction through the boss 216L.

The boss 216R is located on the right housing 212. The boss 216R protrudes from an outer surface of the right housing 212.

The boss 216R includes a threaded hole 2162 and an insertion hole 2163. The insertion hole 2163 is coaxial with the threaded hole 2162 and extends straight or substantially straight in the left-right direction with a constant or substantially constant diameter. The diameter of the insertion hole 2163 is larger than that of the threaded hole 2162. The threaded hole 2162 is located closer to the boss 216L than the insertion hole 2163 in the left-right direction. A right end of the threaded hole 2162 (for example, a furthermost position in a second axial direction) is connected to a left end of the insertion hole 2163 (for example, a furthermost position in a first axial direction) via a stepped surface 2164. The stepped surface 2164 continually extends over an entire circumference of the threaded hole 2162 about the central axis. For example, the stepped surface 2164 is annular or substantially annular.

When the left housing 211 is attached to the right housing 212, the hole 2161, the threaded hole 2162 and insertion hole 2163 are coaxial. A cylindrical or substantially cylindrical member 56 (hereinafter "cylindrical member 56") is lightly press-fitted into the insertion hole 2163. The cylindrical member 56 is preferably a fitting, for example. The cylindrical member 56 includes a body 561 and a flange 562.

The body 561 is inserted into the insertion hole 2163. The body 561 is cylindrical or substantially cylindrical in shape. For example, the body 561 includes a cylindrical inner periphery 561A and a cylindrical outer periphery 561B. The body 561 includes a hole defined by the inner periphery 561A.

The inner periphery 561A extends straight or substantially straight in the left-right direction (for example, an axial direction) of the body 561 with a constant or substantially constant diameter. A thread groove is preferably located on the inner periphery 561A. For example, the body 561 includes a threaded hole.

The outer periphery 561B extends straight or substantially straight in the left-right direction (for example, the axial direction) of the body 561 with a constant or substantially constant diameter. The outer periphery 561B is in contact with the inner surface of the insertion hole 2163.

A recess 5613 is located on a left end of the body 561 (for example, furthermost position in the first axial direction). The recess 5613 is coaxial with the inner periphery 561A. A left end of the inner periphery 561A (furthermost position in the first axial direction) is connected to an inner surface of the recess 5613. For example, the hole defined by the inner periphery 561A (for example, the threaded hole of the body 561) is open on the inner surface of the recess 5613.

The flange 562 extends outward in radial directions of the body 561 from a right end of the body 561 (for example, furthermost point in the second axial direction). The flange 562 preferably includes a circumferential portion having a different length or size measured from the outer periphery 561B of the body 561 (for example, a radial dimension). As shown in FIG. 2, the flange 562 is not circular in shape as viewed in an axial direction of the body 561. For example, the flange 562 is a deformed flange.

As shown in FIG. 2, the flange 562 is in contact with a protrusion 2121 disposed on the right housing 212. This contact prevents the cylindrical member 56 from rotating in a circumferential direction.

Returning to FIGS. 2 and 3, the attachment portion 217 is located on the housing 21. The attachment portion 217 protrudes from the outer surface of the housing 21. The attachment portion 217 is located rearward of and lower than the crank axle 22. The attachment portion 217 is located rearward of and lower than the attachment portion 216.

The attachment portion 217 preferably has the same construction as the attachment portion 216 (FIG. 5). For example, similar to the attachment portion 216, the attachment portion 217 includes a boss 217L (FIG. 3) located on the left housing 211 and a boss 217R (FIG. 2) located on the right housing 212. Similar to the boss 216L, the boss 217L preferably includes a hole. Similar to the boss 216R, the boss 217R preferably includes a threaded hole and an insertion hole. As shown in FIG. 2, a cylindrical or substantially cylindrical member 58 (hereinafter "cylindrical member 58") is lightly press-fitted into the insertion hole. The cylindrical member 58 preferably has a shape similar to that of the cylindrical member 56. The flange 582 of the cylindrical member 58 is in contact with a protrusion 2122 disposed on the right housing 212. This contact prevents the cylindrical member 58 from rotating in a circumferential direction.

As discussed above, the attachment portion 217 preferably has the same construction as the attachment portion 216 (FIG. 5). Accordingly, the attachment portion 217 will not be described in detail.

When the left housing 211 is attached to the right housing 212, the hole in the boss 217L and the threaded hole and the insertion hole in the boss 217R are coaxial.

Attachment of the attachment portion 216 to the bracket 125 will be described with reference to FIGS. 6A to 6C. Attachment of the attachment portion 217 to the bracket 125 will not be described in detail since it is the same as that regarding attachment of the attachment portion 216 to the bracket 125.

Figure 6A:
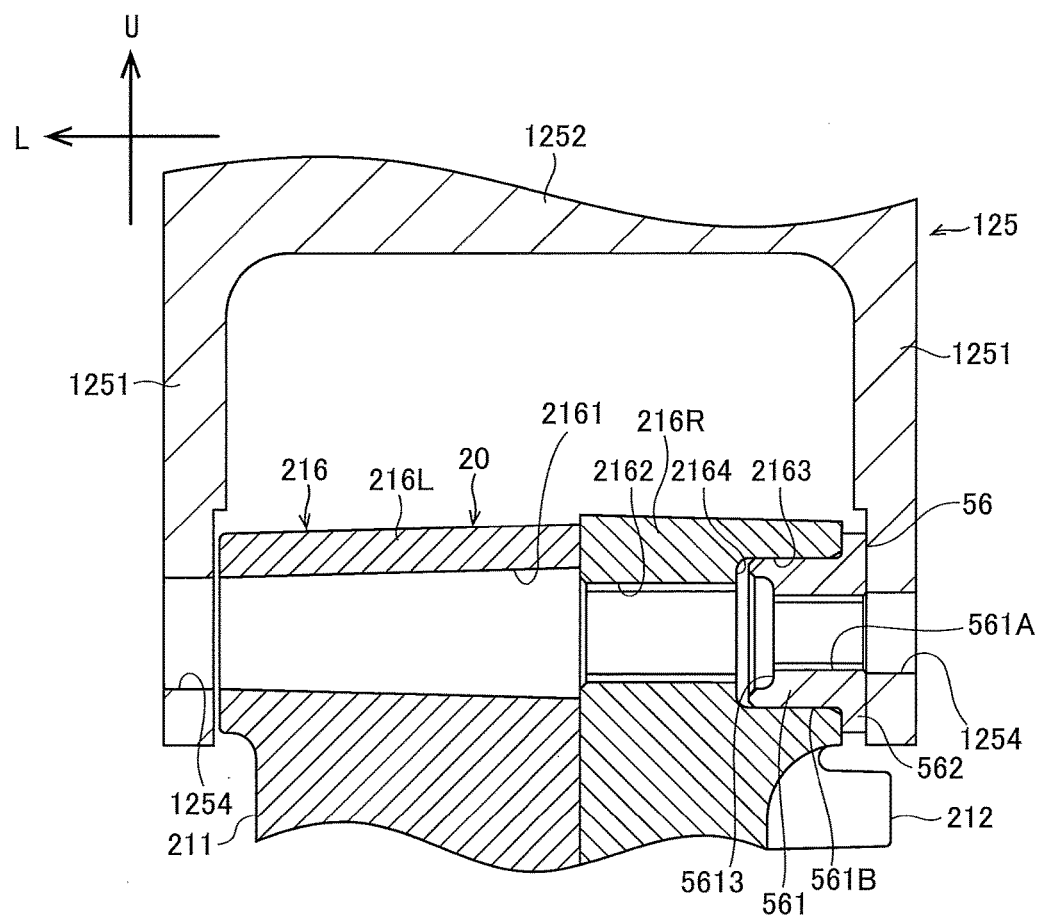
FIG. 6A is a cross-sectional view illustrating a step of a method of attaching the drive unit to the bracket where the drive unit is located between two side plates of the bracket.
Figure 6B:
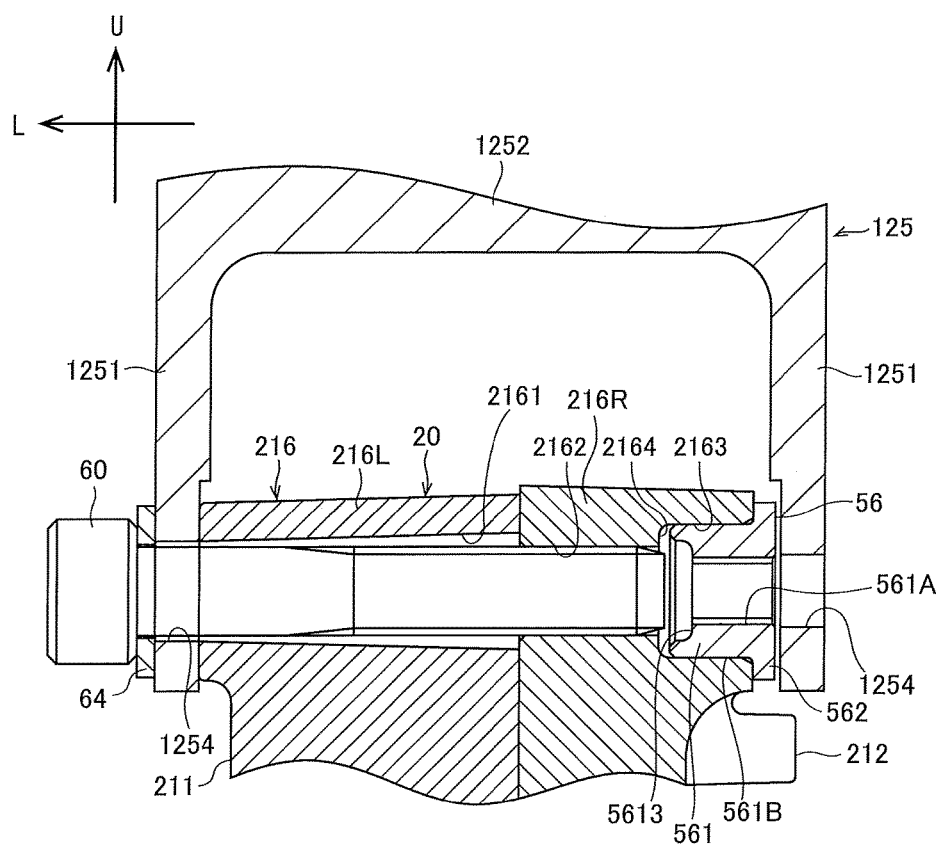
FIG. 6B is a cross-sectional view illustrating another step of the method of attaching the drive unit to the bracket where the drive unit is in contact with a left side plate as a result of a left bolt being tightened.
Figure 6C:
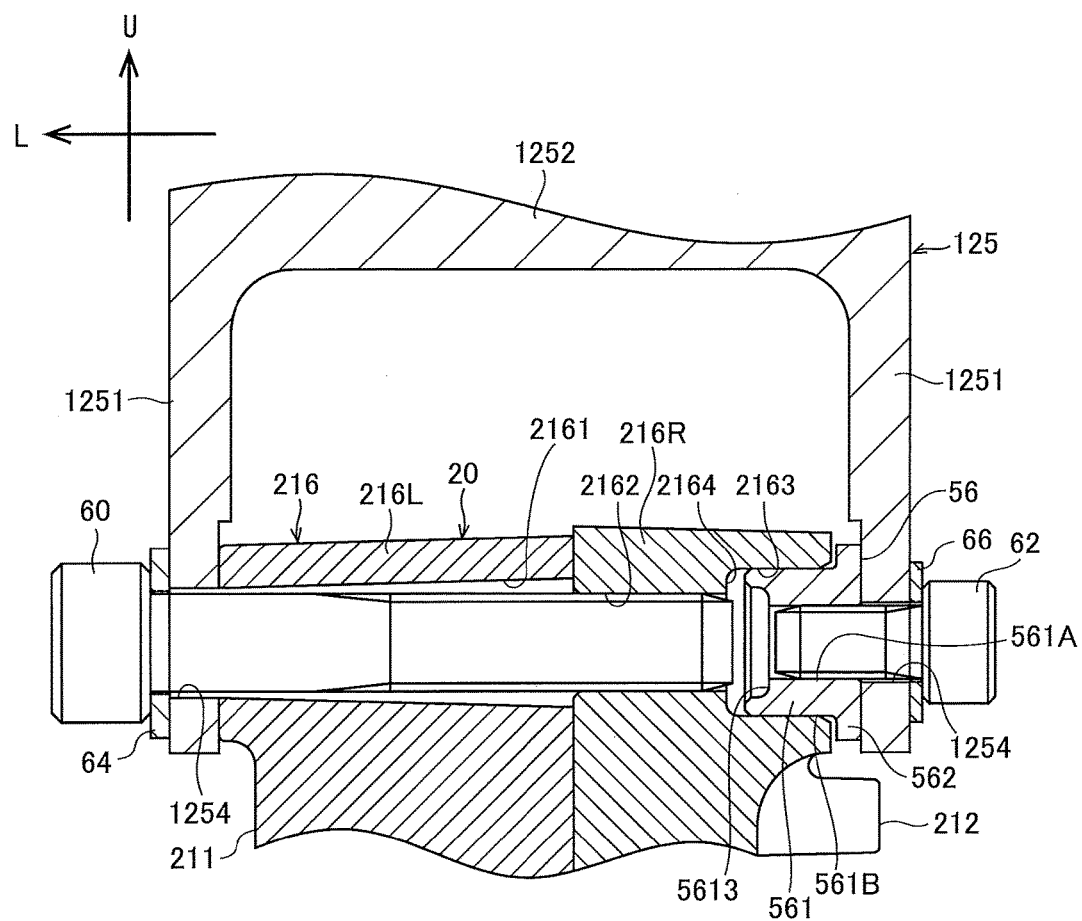
FIG. 6C is a cross-sectional view illustrating yet another step of the method of attaching the drive unit to the bracket where the cylindrical member is in contact with a right side plate as a result of a right bolt being tightened.

As shown in FIG. 6A, the attachment portion 216 is located between the side plates 1251. A portion of each of the side plates 1251 overlaps the attachment portion 216, as viewed in a left-right direction. Holes 1254 in the side plates 1251 are coaxial with the hole 2161, the threaded hole 2162 and the insertion hole 2163 of the attachment portion 216. The cylindrical member 56 is lightly press-fitted into the insertion hole 2163. A gap is located between the left side plate 1251 and attachment portion 216 (or boss 216L) and between the right side plate 1251 and cylindrical member 56. FIG. 6A shows the right side plate 1251 in contact with the cylindrical member 56 to illustrate the gap between the left side plate 1251 and attachment portion 216 (or boss 216L).

A bolt 60 (FIG. 5) is inserted from the left (for example, from the outside) into the hole 1254 in the left side plate 1251. The bolt 60 is inserted through a washer 64 (FIG. 5) located to the left (for example, outward) of the left side plate 1251. After being inserted into the hole 1254, the bolt 60 is inserted into the hole 2161 of the attachment portion 216. The thread on the outer periphery of the bolt 60 engages a thread groove in the threaded hole 2162. As the bolt 50 is tightened, the attachment portion 216 of the drive unit 20 is moved or pushed toward the left side plate 1251 by the associated gap. As a result, as shown in FIG. 6B, the attachment portion 216 (or boss 216L) contacts the left side plate 1251. When the bolt 60 is further tightened, the left side plate 1251 is tightly sandwiched between the attachment portion 216 (or boss 216L) and the washer 64 (or a head of the bolt 60). Accordingly, a gap is provided between the right side plate 1251 and cylindrical member 56, as shown in FIG. 6B.

The bolt 62 (FIG. 5) is inserted from the right (for example, from the outside) into the hole 1254 in the right side plate 1251. The bolt 62 is inserted through a washer 66 (FIG. 5) located to the right (for example, outward) of the right side plate 1251. The bolt 62 is inserted into the cylindrical member 56. The thread on the outer periphery of the bolt 62 engages the thread groove on the inner periphery 561A of the cylindrical member 56. As the bolt 62 is tightened, the cylindrical member 56, which is lightly press-fitted into the insertion hole 2163, is moved or pushed to draw the cylindrical member 56 out of the insertion hole 2163 toward the right (for example, in a direction outward of the insertion hole 2163) by an amount of the gap. Accordingly, the cylindrical member 56 is in contact with the right side plate 1251, as shown in FIG. 6C. When the bolt 62 is further tightened, the right side plate 1251 is tightly sandwiched by the cylindrical member 56 and washer 66 (or a head of the bolt 62).

According to a preferred embodiment of the present invention described above, a first suspension boss includes the boss 216L and a portion of the boss 216R which includes the threaded hole 2162. Further, according to the present preferred embodiment, a second suspension boss includes a portion of the boss 216R including the insertion hole 2163.

In the electric-motor-assisted bicycle 10, the drive unit 20 is attached to the bracket 125 as discussed above. Tightening of the bolt 62 moves the cylindrical member 56 toward the right. The distance between a right end surface of the cylindrical member 56 and a left end surface of the attachment portion 216 (or boss 216L) (for example, a dimension in the left-right direction) is adjusted depending on the distance between the side plates 1251 (for example, separation in the left-right direction). Thus, when the drive unit 20 is attached to the bracket 125, it is not necessary to deform each of the side plates 1251, which makes it possible to securely attach the drive unit 20 to the bracket 125 even when the bracket 125 has a high stiffness.

In the electric-motor-assisted bicycle 10, an outer diameter of the body 561 of the cylindrical member 56 is larger than a diameter of the threaded hole 2162 which makes it possible to increase the contact surface of the cylindrical member 56 with respect to the right side plate 1251. Thus, the drive unit 20 is more securely attached to the bracket 125.

Since the outer diameter of the body 561 of the cylindrical member 56 is larger than the diameter of the threaded hole 2162, the cross-sectional area of the cylindrical member 56 along directions perpendicular or substantially perpendicular to the central axis thereof is increased. The increased cross-sectional area of the cylindrical member 56 imparts strength that is sufficient to resist external forces applied thereto.

In the electric-motor-assisted bicycle 10, the flange 562 on a right end of the body 561 (for example, furthermost point in the second axial direction) is in contact with the right side plate 1251. A contact area of the cylindrical member 56 with respect to the right side plate 1251 is increased. Thus, the drive unit 20 is more securely attached to the bracket 125.

Other Preferred Embodiments

Figure 7:
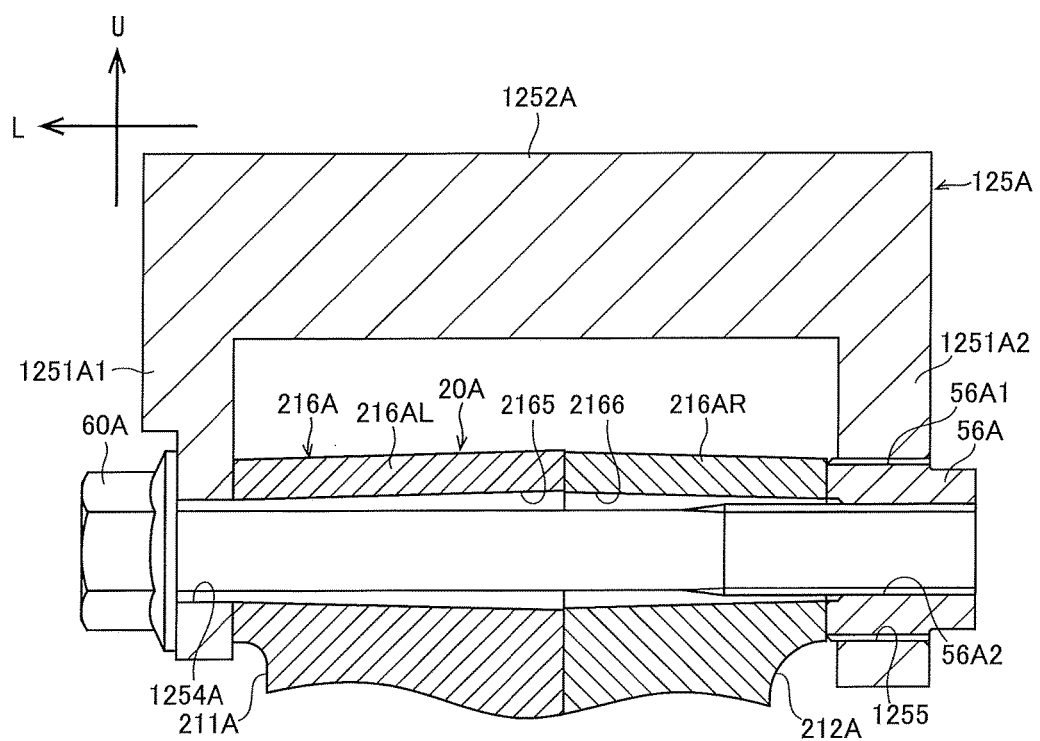
FIG. 7 is a cross-sectional view showing a preferred embodiment of the structure that attaches the drive unit to the bracket.

The structure that attaches the drive unit to the bracket is not limited to that described above. For example, the structure shown in FIG. 7 may be used. The structure that attaches a drive unit 20A to a bracket 125A is described with reference to FIG. 7.

The attachment portions of the drive unit 20A are different from the attachment portions of the drive unit 20 discussed above. The drive unit 20A includes an attachment portion 216A. The attachment portion 216A includes a boss 216AL and a boss 216AR. A hole 2165 is located in the boss 216AL. A hole 2166 is located in the boss 216AR.

The bracket 125A includes left and right side plates 1251A1, 1251A2 and a top plate 1252A. A hole 1254A is disposed in the left side plate 1251A1. A threaded hole 1255 is disposed in the right side plate 1251A2. A left-hand thread groove, for example, is located in the threaded hole 1255.

A cylindrical member 56A is inserted through the threaded hole 1255. The cylindrical member 56A is cylindrical or substantially cylindrical in shape. For example, the cylindrical member 56A includes a cylindrical outer periphery 56A1 and a cylindrical inner periphery 56A2.

The outer periphery 56A1 preferably includes a thread that engages the left-hand thread groove in the threaded hole 1255. For example, the thread on the outer periphery 56A1 is preferably a left-hand thread. When the cylindrical member 56A is inserted through the threaded hole 1255, the thread on the outer periphery 56A1 engages the left-hand thread groove in the threaded hole 1255. For example, the cylindrical member 56A is inserted through the threaded hole 1255 and attached to the right side plate 1251A2.

A right-hand thread groove is located on the inner periphery 56A2. For example, the cylindrical member 56A preferably includes a right-hand threaded hole.

A bolt 60A attaches the drive unit 20A to the bracket 125A. The bolt 60A is inserted from the left into the attachment portion 216A. The bolt 60A is inserted through the hole 1254A in the left side plate 1251A1. The thread on the bolt 60A engages the right-hand thread groove on the inner periphery 56A2 of the cylindrical member 56A. For example, the thread on the bolt 60A is preferably a right-hand thread.

The drive unit 20A includes an attachment portion 217A in lieu of the attachment portion 217 (FIG. 2). The attachment portion 217A is not shown or described in detail and preferably has the same construction as the attachment portion 216A.

Attachment of the attachment portion 216A to the bracket 125A will be described with reference to FIGS. 8A and 8B.

Figure 8A:
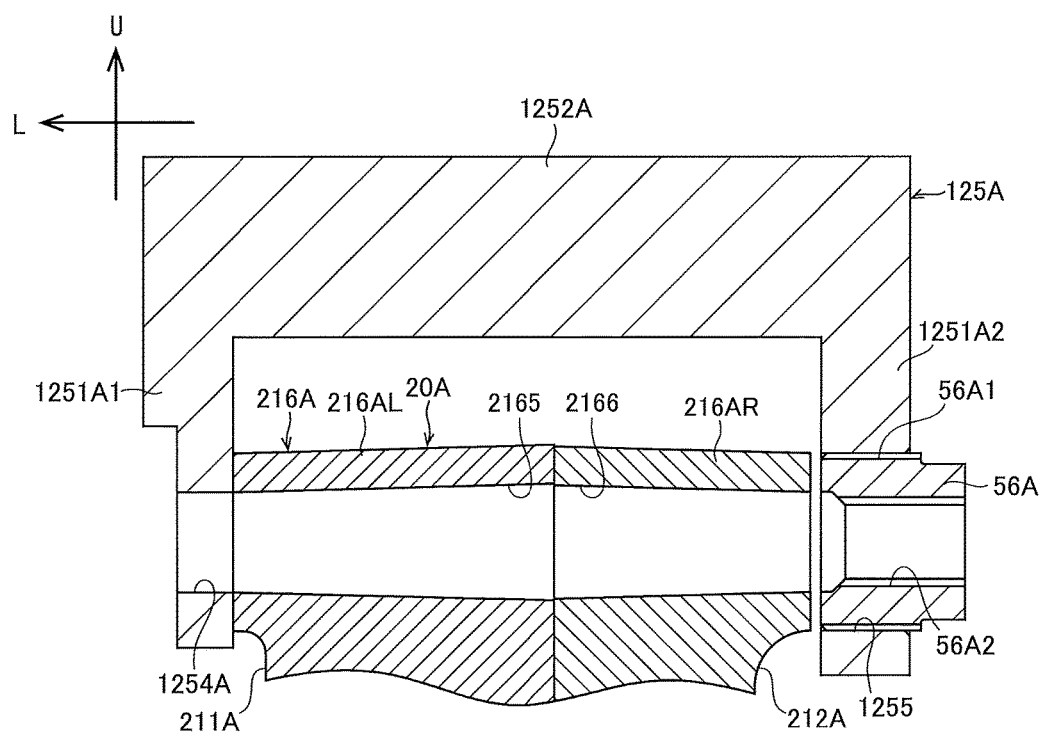
FIG. 8A is a cross-sectional view illustrating a step of the method of attaching the drive unit to the bracket where the drive unit is located between the two side plates of the bracket and a cylindrical member is attached to the right side plate.
Figure 8B:
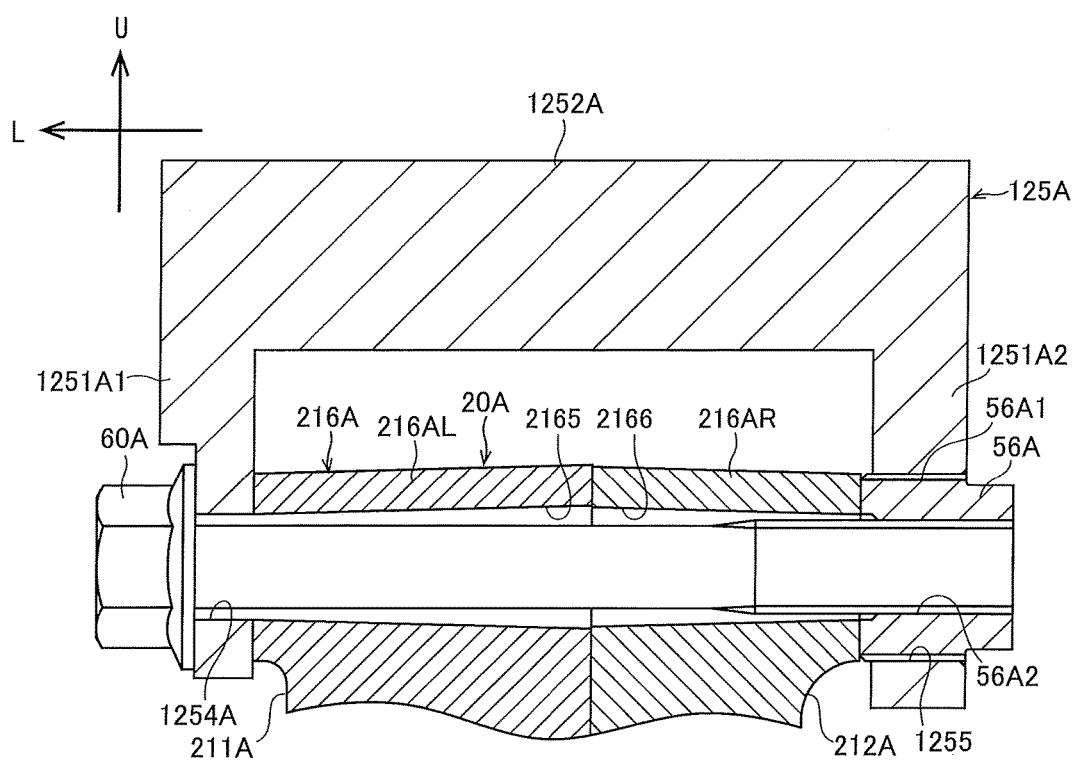
FIG. 8B is a cross-sectional view illustrating another step of the method of attaching the drive unit to the bracket where the drive unit is sandwiched between the cylindrical member and the left side plate.

As shown in FIG. 8A, the attachment portion 216A is located between the left and right side plates 1251A1 and 1251A2. A portion of each of the left and right side plates 1251A1 and 1251A2 overlaps the attachment portion 216A, as viewed in a left-right direction. The hole 1254A in the left side plate 1251A1 and the threaded hole 1255 in the right side plate 1251A2 are coaxial with the holes 2165 and 2166 of the attachment portion 216A. A gap is located between the left side plate 1251A1 and attachment portion 216A (boss 216AL) and between the right side plate 1251A2 and attachment portion 216A (boss 216AR). FIG. 8A shows the left side plate 1251A1 in contact with the attachment portion 216A (boss 216AL) to illustrate that a gap is provided between the right side plate 1251A2 (for example, the cylindrical member 56A attached to the right side plate 1251A2) and the attachment portion 216A (boss 216AR).

The bolt 60A (FIG. 7) is inserted from the left (for example, from the outside) into the hole 1254A in the left side plate 1251A1. After being inserted into the hole 1254A, the bolt 60A is inserted into the hole 2165, the hole 2166 of the attachment portion 216A, and the cylindrical member 56A. The bolt 60A is rotated a predetermined amount in the right-hand thread direction such that the thread on the outer periphery of the bolt 60A reaches a midpoint of a length of the right-hand thread groove on the inner periphery 56A2 of the cylindrical member 56A while engaging the right-hand thread groove.

Subsequently, the cylindrical member 56A is rotated in the left-hand thread direction. This rotation moves the cylindrical member 56A toward the attachment portion 216A. When the cylindrical member 56A is rotated in the left-hand thread direction, the cylindrical member 56A rotates relative to the bolt 60A in the counter-right-hand thread direction, for example, in a direction that causes the bolt 60A to move out of the cylindrical member 56A. If the bolt 60A is not restricted from rotating, bolt 60A rotates with the cylindrical member 56A. If the bolt 60A is restricted from rotating, the rotation of the cylindrical member 56A in the left-hand thread direction urges the bolt 60A to move out of the cylindrical member 56A. However, since an amount of the movement is small, the bolt 60A does not move completely out of the cylindrical member 56A.

When the cylindrical member 56A moves toward the attachment portion 216A, the cylindrical member 56A contacts the attachment portion 216A (boss 216AR). When the cylindrical member 56A is further rotated, the cylindrical member 56A moves toward the left side plate 1251A1 while pushing the attachment portion 216A. Accordingly, with the cylindrical member 56A in contact with the attachment portion 216A (boss 216AR), the attachment portion 216A (boss 216AL) contacts the left side plate 1251A1, as shown in FIG. 8B.

When the bolt 60A is further tightened, for example, when the bolt 60A is further tightened in the right-hand thread direction, the cylindrical member 56A is further tightened in the left-hand thread direction. Thus, the attachment portion 216A is sandwiched between the left side plate 1251A1 and cylindrical member 56A. Further, the left side plate 1251A1 is tightly sandwiched by a head of the bolt 60A and the attachment portion 216A. Thus, the drive unit 20A is securely attached to the bracket 125A.

The drive unit 20A is attached to the bracket 125A as described above. A distance between the cylindrical member 56A attached to the right side plate 1251A2 and the left side plate 1251A1 (for example, a distance in the left-right direction) is adjusted depending on the attachment portion 216A of the drive unit 20A. Thus, deformation of each of the left and right side plates 1251A1 and 1251A2 when the drive unit 20A is attached to the bracket 125A is not necessary. Accordingly, the drive unit 20A is securely attached to the bracket 125A even when the bracket 125A has a high stiffness and/or rigidity.

While preferred embodiments of the present invention have been described above, the preferred embodiments described above are merely examples that allow the present invention to be carried out. Thus, the present invention is not limited to these preferred embodiments, and the preferred embodiments may be modified as appropriate without departing from the spirit of the present invention when carried out.

For example, the preferred embodiments of the present invention described above includes the chain stays 301 which are swingably or pivotably attached to the bracket 125. Alternatively, the chain stays 301 may be fixed to the bracket 125.

For example, according to the preferred embodiments described above, the electric-motor-assisted bicycle 10 includes the suspension 304. Alternatively, the suspension 304 does not need to be included.

A construction of the drive unit is not limited to the preferred embodiments described above. For example, the drive unit 20 may combine human power (for example, pedaling forces) and motor drive power into a resultant force. Alternatively, the drive unit 20 may transmit motor drive power via an auxiliary sprocket located on the shaft of the reduction gear and add the motor drive power at a midpoint along a chain wound around the driving sprocket and the driven sprocket.

In a preferred embodiment of the present invention, the threaded hole 2162 need not be coaxial with the insertion hole 2163. The threaded hole 2162 need not be connected to the insertion hole 2163. The threaded hole 2162 may be located in the boss 216L. The boss 216L need not be located at a same position as the boss 216R, as viewed in a left-right direction. The separate left and right housings may be replaced by an integral housing. In these preferred embodiments, the bolt 60 and the boss through which the bolt is inserted preferably have small lengths. A thread located on the bolt 60 may engage a thread groove located in a threaded hole in a separate nut. In this preferred embodiment, the separate nut may be attached to the housing 21 in advance, and then screwed onto the bolt 60, or the separate nut may be screwed onto the bolt 60 while outside the housing 21.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An electric-motor-assisted bicycle comprising:
a front wheel;
a rear wheel located rearward of the front wheel;
a vehicle-body frame that supports the front wheel and the rear wheel; and
a drive unit attached to the vehicle-body frame to generate driving power to be transmitted to the rear wheel;
wherein
the drive unit includes:
a housing; and
a crank axle extending through the housing in a left-right direction with respect to the bicycle;
the vehicle-body frame includes a bracket;
the drive unit is attached to the bracket;
the bracket includes:
a top plate;
a first side plate connected to the top plate; and a second side plate connected to the top plate, the second side plate being spaced apart from the first side plate along the left-right direction of the bicycle;

the housing includes a first suspension boss and a second suspension boss located between the first side plate and the second side plate along the left-right direction of the bicycle;

a first bolt is fastened to the first suspension boss and extends through a hole in the first side plate along the left-right direction of the bicycle;

an insertion hole is provided in the second suspension boss, the insertion hole extending in the left-right direction of the bicycle and being open toward the second side plate;

the electric-motor-assisted bicycle further comprises a cylindrical member fitted into the insertion hole and slidable in a direction in which the insertion hole extends;

a thread groove is provided on an inner periphery of the cylindrical member, the thread groove engaging a thread on an outer periphery of a second bolt that extends through a hole provided in the second side plate along the left-right direction of the bicycle;

the first bolt is fastened to the first suspension boss such that tightening of the first bolt causes the housing to move toward the first side plate along the left-right direction with respect to the bicycle such that the housing is pushed against the first side plate; and the thread on the outer periphery of the second bolt engages the thread groove provided on the inner periphery of the cylindrical member such that tightening of the second bolt causes the cylindrical member to move in a direction from out of the insertion hole such that the cylindrical member is pushed against the second side plate.

2. The electric-motor-assisted bicycle according to claim 1, wherein the housing includes:
   a first housing; and
   a second housing located closer to the second side plate than the first housing is, the second housing being attached to the first housing;
   the first suspension boss is located over the first and second housing; and
   the second suspension boss is located on the second housing.

3. The electric-motor-assisted bicycle according to claim 1, wherein the housing includes:
   a first housing; and
   a second housing located closer to the second side plate than the first housing is, the second housing being attached to the first housing;
   the first suspension boss is located on the first housing; and
   the second suspension boss is located on the second housing.

4. The electric-motor-assisted bicycle according to claim 1, wherein the first bolt is fastened to the first suspension boss via a threaded hole in the first suspension boss.

5. The electric-motor-assisted bicycle according to claim 1, wherein the first bolt is fastened to the first suspension boss via a nut.

6. The electric-motor-assisted bicycle according to claim 1, wherein the first bolt is coaxial with the insertion hole.

7. The electric-motor-assisted bicycle according to claim 1, wherein each of the insertion hole and the cylindrical member has a larger diameter than a stem of the first bolt.

8. The electric-motor-assisted bicycle according to claim 1, wherein the cylindrical member includes:
   a body inserted into the insertion hole; and
   a flange provided on an end of the body along an axial direction thereof and extending from an outer periphery of the body in a direction perpendicular or substantially perpendicular to the axial direction of the body; and
   the flange is pushed against the second side plate.

9. The electric-motor-assisted bicycle according to claim 8, wherein the housing includes a protrusion that contacts the flange such that the protrusion and flange are positioned in a circumferential direction of the cylindrical member to prevent rotation of the cylindrical member.

* * * * *